(12) United States Patent
Schneider et al.

(10) Patent No.: US 8,974,880 B2
(45) Date of Patent: Mar. 10, 2015

(54) WAX BLENDS CONTAINING LONG-CHAIN HYDROCARBONS AND ALCOHOLS, PRINTING INK COMPOSITIONS AND THERMAL TRANSFER RIBBONS CONTAINING SUCH WAX BLENDS, AND USE OF THE WAX BLENDS

(75) Inventors: Ulrich Schneider, Heist (DE); Uwe Kurras, Hamburg (DE); Thorsten Frick, Hamburg (DE)

(73) Assignee: Sasol Wax GmbH, Hamburg (DE)

( * ) Notice: Subject to any disclaimer, the term of this patent is extended or adjusted under 35 U.S.C. 154(b) by 103 days.

(21) Appl. No.: 13/820,312

(22) PCT Filed: Sep. 2, 2011

(86) PCT No.: PCT/DE2011/001675
§ 371 (c)(1),
(2), (4) Date: Apr. 30, 2013

(87) PCT Pub. No.: WO2012/048672
PCT Pub. Date: Apr. 19, 2012

(65) Prior Publication Data
US 2013/0209709 A1    Aug. 15, 2013

(51) Int. Cl.
*B41M 5/392*    (2006.01)
*C09D 11/12*    (2006.01)
*C08L 91/06*    (2006.01)
*C09D 11/00*    (2014.01)
*B41J 31/02*    (2006.01)
*C09D 11/34*    (2014.01)

(52) U.S. Cl.
CPC ............ *C09D 11/00* (2013.01); *B41M 2205/06* (2013.01); *B41J 31/02* (2013.01); *C09D 11/12* (2013.01); *C09D 11/34* (2013.01); *C08L 91/06* (2013.01); *B41M 5/392* (2013.01)
USPC .................. 428/32.83; 106/31.29; 106/31.61; 106/502; 428/32.87

(58) Field of Classification Search
CPC .. B41M 5/392; B41M 2205/06; C09D 11/12; C08L 91/06
USPC .............. 428/32.83, 32.87; 106/31.29, 31.61, 106/502
See application file for complete search history.

(56) References Cited

U.S. PATENT DOCUMENTS

| 2003/0149134 | A1 | 8/2003 | Modi et al. |
| 2006/0183813 | A1 | 8/2006 | Modi et al. |
| 2007/0119337 | A1 | 5/2007 | Breton et al. |
| 2007/0119338 | A1 | 5/2007 | Breton et al. |
| 2009/0194004 | A1 | 8/2009 | Meyer et al. |

FOREIGN PATENT DOCUMENTS

| DE | 102005035515 | 2/2007 |
| DE | 602005004247 | 5/2008 |
| EP | 1 666 548 | 6/2006 |
| JP | 05331254 | 12/1993 |
| JP | 06329993 | 11/1994 |
| WO | WO 00/06617 | 2/2000 |

*Primary Examiner* — Bruce H Hess
(74) *Attorney, Agent, or Firm* — Bushman Werner, P.C.

(57) ABSTRACT

The invention relates wax blends containing long-chain hydrocarbons and alcohols, to printing ink compositions and thermal transfer ribbons containing the wax blends, and to the use of said wax blends as additives in printing inks.

21 Claims, 1 Drawing Sheet

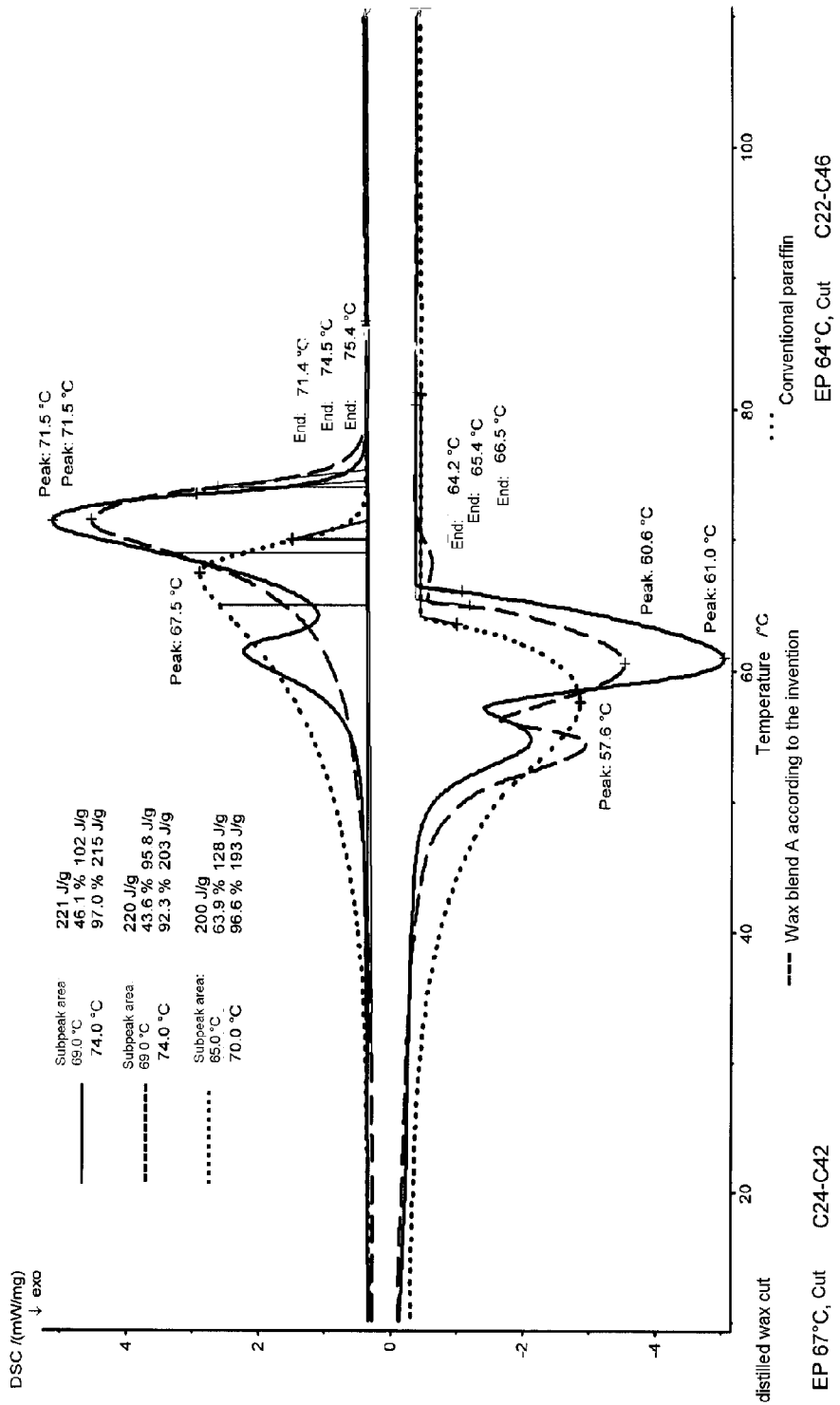

WAX BLENDS CONTAINING LONG-CHAIN HYDROCARBONS AND ALCOHOLS, PRINTING INK COMPOSITIONS AND THERMAL TRANSFER RIBBONS CONTAINING SUCH WAX BLENDS, AND USE OF THE WAX BLENDS

CROSS REFERENCE TO RELATED APPLICATION

This application is a national phase of PCT/DE2011/001675, filed Sep. 2, 2011, which claims priority to DE 102010044319.0, filed Sep. 3, 2010, the disclosures of which are incorporated herein by reference for all purposes.

FIELD OF THE INVENTION

The present invention relates to wax blends containing long-chain hydrocarbons and alcohols, printing ink compositions and thermal transfer ribbons containing such wax blends, and use of the wax blends as additives in printing inks.

BACKGROUND OF THE INVENTION

The use of paraffin wax mixtures is known in the printing industry. For some applications, wax blends with very closely cut C chain distribution are used. Such wax blends are obtained as fractions by distilling from natural or synthetic paraffins. Because of the closely cut C chain distribution, the wax melts quickly and completely during the printing process, and the printing ink congeals rapidly after the printing process. Such waxes ensure that the application of the printing ink to the carrier medium is clean due to their low viscosity and narrow melting range. Said waxes also lend the printing ink a corresponding sliding behaviour ("slip") thus also performing a shielding function after the printing process.

Particularly closely cut paraffin waxes must be prepared in special distillation processes with equipment designed especially for this task, there are only limited quantities thereof available worldwide, and they are very expensive.

The problem that prompted the invention was therefore to provide novel wax blends that have a narrow, defined melting range. Unlike separately distilled wax fractions, the wax blends according to the invention are provided by mixing certain components that are more readily available and less expensive.

In this context, the blends should be converted from a solid to a low-viscosity liquid state as directly as possible. Such behaviour is required particularly in the case of printing inks that include wax mixtures as the carrier substance. These may be used in toner printing inks and as thermal transfer ribbons (TTR) or as wax-based printing inks for digital printing or powder paints.

Normally, it is not possible to use oleochemical base materials that also have a narrow melting range as an alternative to the closely cut waxes, because of the other properties of such substances, such as brittleness, crystallinity and the like.

SUMMARY OF THE INVENTION

In the wax blends according to the invention, it has been discovered, surprisingly, that a selection of waxes that are already known and long-chain alcohols including aliphatic polyethers with hydroxyl functionality results in products with an equally narrow melting range that are equally usable in industry. The molten material has good flow characteristics and relatively low viscosity.

BRIEF DESCRIPTION OF THE DRAWINGS

FIG. 1 illustrates the differential scanning calorimetry of one embodiment of the present invention.

DETAILED DESCRIPTION OF PREFERRED EMBODIMENTS

The wax blends according to the invention may be obtained by combining hydrocarbons (paraffin waxes) having carbon chains of different lengths and long chain alcohols. The individual components are adjusted to each as described in the following depending on requirements with respect to the melting point and hardness of the product.

The following may be considered for use as long-chain aliphatic alcohols with 12 to 26 preferably 18 to 28 carbon atoms: fatty alcohols (C12-C22), wax alcohols (C24-C36), polyethers with at least one free hydroxyl group such as polyethylene glycols, glycols, diols and/or polyols. Aliphatic fatty and wax alcohols with at least one hydroxyl group, preferably exactly one hydroxyl group, have proven particularly suitable.

The long-chain hydrocarbons with 18 to 110, particularly 20 to 100 carbon atoms, in one variation more preferably with 20 to 70 carbon atoms, may be selected from the group of alkanes. These may be saturated linear and/or branched hydrocarbon mixtures that may be obtained from mineral oil or by synthetic processes. The group of long-chain hydrocarbons includes paraffin waxes, microcrystalline waxes, Fischer-Tropsch waxes and/or short-chain polyethylene waxes, particularly Fischer-Tropsch waxes having 18 to 110 and preferably 20 to 100 C atoms.

Fischer-Tropsch waxes (FT waxes) are linear hydrocarbons in which 1 to 10% of the molecules have one or more methyl branch(es) (determination of the iso-alkane proportion according to the Standard Test Method for Analysis of Hydrocarbon Waxes by Gas Chromatography—EWF Method 001/03). The FT waxes have a low kinematic viscosity, for example less than 25 $mm^2/s$ at 120° C. and about 21 $mm^2/s$ at 130° C.

According to one embodiment, preferably at least 50% by weight, more particularly 70% by weight of the long-chain hydrocarbons are Fischer-Tropsch waxes. The long-chain hydrocarbons may be a mixture of Fischer-Tropsch waxes and micro-crystalline waxes, and/or the long-chain hydrocarbons and/or at least some of the Fischer-Tropsch waxes are hydroisomerised Fischer-Tropsch waxes.

According to one embodiment, the Fischer-Tropsch waxes preferably have congealing points from 50 to 105° C., particularly 75 to 105° C., and independently thereof are further characterised by a kinematic viscosity lower than 25 $mm^2/s$, particularly lower than 20 $mm^2/s$, at at least 10° C. above the congealing point of the Fischer-Tropsch wax (ASTM D445).

The wax blends may have congealing points from 45 to 80° C., under certain circumstances even as high as 90° C., particularly from 50 to 78° C., particularly preferably from 55 to 75° C., and are then particularly well suited for use in thermal transfer ribbons. On the other hand, the wax blends may have a congealing point from 55 to 90° C., particularly 70 to 90° C., and they are then particularly suitable as or for use in "solid inks" or toners.

Besides the hydrocarbons listed in the preceding, waxes in the form of oxidised, saponified and/or hydroisomerised hydrocarbon derivatives may also be used. The waxes may be used individually or as a mixture of two or more waxes.

For exemplary purposes, the wax blend contains (total equal to 100% by weight, wax blend A)

50-75% by wgt linear fatty alcohols with 20 to 24 C atoms, particularly 22 C atoms, and a congealing point of 67-73° C., 5-15% by wgt Fischer-Tropsch wax with a congealing point of 75-85° C. and 8-20% by wgt a microcrystalline wax with a congealing point of 60-80° C.

5-15% by wgt a paraffin wax with a congealing point of 50-70° C.

An alternative wax blend (total equal to 100% by weight, wax blend B) is:

50-75% by wgt linear fatty alcohols with 20 to 24 C atoms, particularly 22 C atoms, and a congealing point of 67-73° C., 5-15% by wgt Fischer Tropsch wax with a congealing point of 80-105° C. and 8-20% by wgt a hydroisomerised FT wax and a congealing point of 60-90° C.

5-15% by wgt an FT wax with a congealing point of 50-80° C.

A defined melting and congealing behaviour is important for the application properties of the wax blends and the printing ink composition. This is determined by means of dynamic differential scanning calorimetry (DSC) (DIN 53765). DSC is a thermal method for measuring the quantity heat that is given off/absorbed by sample during an isothermal procedure, heating or cooling.

The melting and congealing curves of the measurements taken show that the novel wax blends melt and congeal in the same narrow temperature range as the closely cut wax fractions. The thermal quantities measured in this context are comparable.

For exemplary purposes, the following may be mixed advantageously: (A) Hydrocarbons with 20 to 70 C atoms (preferably 22 to 39% by weight), obtainable for example from an FT wax having 26 to 60 C atoms (preferably more than 8% to 12% by weight) and a microcrystalline wax having 25 to 70 C atoms (preferably more than 9% by weight to 15 by weight) and a paraffin wax having 23-46 C atoms (preferably more than 5% by weight to 12% by weight), and (B) a C18 to C28, particularly a C20 to C22 alcohol.

The printing ink composition may contain from 1 to well over 60% by weight, particularly more than 6% by weight, wax blend in addition to dyes in the form of inorganic pigments or organic dyes. It has been revealed that blends can be produced for different temperature ranges, and thus also working ranges for printing inks, with the aid of fractionated alcohols and corresponding waxes.

Colouring may be performed by dyes. These may be pigments, particularly such as carbon black, but also colouring agents that are soluble in solvents and/or binding agents, organic colouring pigments and various azo dyes (Ceres and Sudan dyestuffs). The printing ink composition preferably contains the colouring agent, particularly colouring pigment, in a quantity from about 5 to 20% by weight. The dyes may belong to the group of azo compounds or the group of polycyclic compounds. Typical examples are monoazo yellow, monoazo orange-, diazo-, β-naphthol-, naphthol-AS-, benzimidazolone, diazo condensation, metal complex, isoindolinone or isoindolin pigments as representatives of the azo compositions and phthalocyanine, quinacridone, perylene, perinone, thioindigo, anthraquinone, anthrapyrimidine, flavanthrone, pyranthrone, anthanthrone, dioxazine, triarylcarbonium, quinophthalone or diketopyrrolopyrrol pigments a representatives of the polycyclic compositions. Since these substances do not exist broken down into molecular form, but as organic solids constructed from said molecules, the physical properties and particularly the colour properties thereof depend not only on their respective molecular structures but also from the constitution of their crystal-line structures. The colouring may also consist of fine-grain carbon particles (carbon black). The wax blend functions as a carrier/carrier component and/or binding agent/binding agent component for the dyestuffs.

The printing ink composition may contain a wide range of additives, for example particularly resins, tackifiers in the form of terpene-phenol resins or other additives.

Examples of such resins are colophonium resins, which may also be modified. Possible modifications are reactions on the double bond, for example a Diels-Alder reaction with maleic acid anhydride (maleinate resins), reactions with phenols and formaldehyde, for example resol formation (phenolic resins) and reactions at the carboxyl group, for example esterification with polyols.

Other resin types are hydrocarbon resins, such as are obtained by cracking mineral oil, hybrid resins and alkyd resins.

Another component of the printing ink composition may be resin-solvent systems with collodion wool, vinyl polymers, polyamide resins, ketone resins, maleate, phenolic, amino, acrylic, polyester or polyurethane resins as binding agents, and primarily ethanol and ethyl acetate, also esters, alcohols and glycol ethers with higher boiling points as solvents.

The thermal transfer ribbon (also called heat transfer film, colour ribbon, carbon ribbon, or thermal ribbon) is an indispensible consumable in thermal transfer printing. It is constructed as follows: The base is formed by the carrier material consisting of a, for example, 3.5 or 6 μm thick polyester film (for example polyethylene terephthalate films), which is notable for excellent mechanical strength, good thermal conductivity and good temperature resilience. The backcoating, silicone based for example, is applied to one side of the polyester film, and serves to protect the printing head from friction damage. The "release layer" (for better detachment of the ink) and the actual, 2 to 4 μm thick printing ink composition containing the wax blend, are applied to the other side. The ink is bound into the wax or resin. An adhesive layer may also be provided, facing towards the print medium (between the paper and the wax layer).

The wax blend according to the invention is contained in the release layer and/or the printing ink. An adhesion promoter, typically constructed from co- and/or ter-polymers with the primary components ethylene and vinyl acetate, may be added to the mixture to enhance adhesion both in its function as the release layer and/or as a component of the printing ink.

The structure may more particularly be as follows: Top coat (adhesion layer if present) with about 0.5 to 0.7 $g/m^2$ wax-bound layer (wax blend according to the invention) with dye stuff having about 4.0 to 4.5 $g/m^2$, separating layer with about 0.5 to 1.0 $g/m^2$, thickness of the carrier (for example polyethylene terephthalate) about 3.5 to 6.0 μm, and optionally back coating (anti-adhesion layer) with about 0.05 to 0.1 $g/m^2$.

There are a several different basic types of thermal transfer ribbons. Wax ribbons are specifically designed for applications with low printing energy. They are used mainly for paper and cardboard labels, where the print ensures strong contrast and thereby also impressive printing results even on rough surfaces. Wax-resin ribbons (also called hybrid ribbons) are applied with medium printing energy. They can be used in an enormous range of applications, both on paper and plastic labels. They are ideal for coated papers, polyethylene (PE), poly-propylene (PP) and textile labels. Their good smear and scratch resistance makes them suitable for many applications.

All wax-resin qualities are thermally stable and are used for example when labelled pallets are shrink-wrapped.

In thermal transfer printing, a thermal transfer film coated with ink and the wax blend (printing ink composition) is used and fed through under a thermal printing head equipped with hundreds of computer controlled heating elements that transfer the print image. The thermal transfer film is advanced between a heater strip and a printing paper, and is heated there. The heating causes the ink particles to melt and separate from the film. The frictional force between the paper and the ink causes these particles to remain stuck to the paper, where they cool down. In order to obtain colour printouts, a film is used on which yellow, cyan and magenta inks are arranged one after the other. Some printers also add black, others create black by mixing. With this method, the print medium does not necessarily have to be (standard) paper. Only the film and the temperature need to be optimised for the medium that is to receive the print, and then even certain plastic surfaces can be printed on. A thermal transfer printer is often used to print permanent labels, such as are used for example to identify parts with serial numbers for goods with a long service life, and which must last for the entire service life of said part.

A similar method in which the wax blends according to the invention may be used is thermal sublimation printing. The difference resides in the fact that the inks deposited on the carrier film are evaporated by applying heat. Then, the ink passes from the solid phase directly to the gas phase. The gaseous ink either penetrates the material that is to receive the print (paper) or is precipitated onto it (plastic). The quantity of ink to be transferred (for example 64 shades per colour) is also controlled on the basis of the amount of energy applied to each printed point, so that a high degree of colour resolution is achieved and exceptionally vivid colours are created.

If the method is used for printing digital images, the same printing position must be adopted up to four times for each (colour) pixel in order to generate the desired shade with the usual four standard printing inks (cyan, magenta, yellow and black).

The dyes containing wax blend are also used in printing inks called "solid inks". These are inks in the form of solid blocks that are installed in a printer as cartridges for example. The solid blocks are melted and deposited on the printed medium via ink jet heads. The solid blocks can also be provided in various colours, for example cyan, magenta, yellow and black.

"Solid inks" are used in phase change printers whose function is equivalent to that of inkjet printers. Instead of the ink jet, the wax blend of a wax stick is liquefied at for example 90° C. and kept in the liquid state in a reservoir. This is transferred to the paper via a print head similar to that of an inkjet printer. The liquid was cools down as soon as it exist the print nozzles. Four wax-like colour sticks serve as the colour carriers. These are melted in succession and kept in the liquid state at 90° C. in a reserve tank. From there, they are transferred to the paper via the print head according to the same principle as with inkjet printers. The 'ink' reverts back to the solid state immediately after it touches the paper. In this way, even with highly absorbent paper types, only as much ink penetrates the paper as is necessary to ensure good adhesion.

The necessary congealing point may be specified by adapting the wax blend according to the invention depending on the requirements of the application process. This is performed by mixing the individual components according to the invention appropriately.

The invention will be explained in greater detail with reference to the following embodiments and FIG. 1, representing a DSC for wax blend A and other products:

Description of The Experiment:

The components of the wax phase were placed one after the other in a heatable mixing container equipped with an agitator and heated to 130° C. Subsequently, the fatty alcohol was added while stirring and the process was continued until a clear mixture was obtained.

The DSC analysis shows that the wax blend according to the invention (corresponding to wax blend A) and a distilled wax cut manufactured by Nippon-Seiro with a congealing point of 67° C. and a C chain number from 22 to 42 absorb approximately 50% of the melting energy in a temperature range of plus/minus 2.5° C. about the melt curve maximum. This behaviour ensures rapid melting and congealing of these materials. In contrast, a standard paraffin (Sasolwax 6403 with a congealing point of 64° C. and a C chain number from 22 to 46) only absorbs about 30% of the melt energy within the comparable interval, which means that it does not have the same conversion speed as the materials described previously.

The invention claimed is:

1. Wax blends comprising:
   (A) 5 to 95% by weight of at least one long-chain hydrocarbon having 18 to 110 carbon atoms, and
   (B) 5 to 95% by weight of at least one long-chain alcohol having 12 to 36 carbon atoms,
      wherein the weight percents of (A) and (B) are relative to the total of (A) and (B),
      wherein the congealing point of the long-chain hydrocarbon and the congealing point of the long-chain alcohol do not differ by more than 10 ° C., and the hydrocarbons (A) and the alcohols (B) comprise from 80 to 100% by weight of the wax blends; and
      wherein the long-chain hydrocarbon comprises Fischer-Tropsch wax or hydroisomerised Fischer-Tropsch wax or both.

2. The wax blends according to claim 1, wherein the Fischer-Tropsch waxes or hydroisomerised Fischer-Tropsch waxes have congealing points from 50 to 105° C.

3. The wax blends according to claim 1, wherein the Fischer-Tropsch waxes have a kinematic viscosity less than 25 $mm^2/s$, particularly less than 20 $mm^2/s$, at a temperature at least 10 ° C. higher than the congealing point (ASTM D445).

4. The wax blends according to claim 1, wherein the congealing point of the long-chain hydrocarbon and the congealing point of the long-chain alcohol do not differ by more than 8° C.

5. The wax blends according to claim 1, wherein the congealing point of the wax blend is 45 to 90° C.

6. The wax blends according to claim 5, wherein the congealing point of the wax blend is 55 to 75° C.

7. The wax blends according to claim 1, wherein the congealing point of the wax blend is 55 to 90° C.

8. The wax blends according to claim 1, comprising:
   (A) 20 to 50% by weight hydrocarbons (A) and
   (B) 50 to 80% by weight alcohols (B),
wherein the weight percents of (A) and (B) are relative to the total of (A) and (B).

9. The wax blends according to claim 8, comprising:
   (A) 20 to 40% by weight hydrocarbons (A) and
   (B) 60 to 80% by weight alcohols (B) relative in each case to the total of (A) and (B).

10. The wax blends according to claim 1, characterised in that 40 to 80% of the melt energy is absorbed in a temperature range of plus/minus 2.5° C. the maximum of the melt curve.

11. The wax blends according to claim 10, wherein 45 to 75% of the melt energy is absorbed in a temperature range of plus/minus 2.5° C. the maximum of the melt curve.

12. The wax blends according to claim 1, characterised in that the long-chain hydrocarbons are hydrocarbons having 20 to 100 carbon atoms.

13. Printing ink compositions comprising the wax blends according to claim 1, further comprising at least one dye, at least one resin, or at least one adhesion promoter, or mixtures thereof.

14. The printing ink compositions according to claim 13, comprising 5 to 20% by weight dye.

15. The printing ink compositions according to claim 13, comprising 0.5 to 10% by weight resins.

16. The printing ink compositions according to claim 13, comprising 0.2 to 10% by weight adhesion promoters.

17. A thermal transfer ribbon comprising a carrier film made from a polymer plastic material and at least one layer of the printing ink composition according to claim 13.

18. The wax blends according to claim 1, wherein at least 50% by weight of the long-chain hydrocarbons are Fischer-Tropsch waxes.

19. The wax blends according to claim 18, wherein at least 70% by weight of the long-chain hydrocarbons are Fischer-Tropsch waxes.

20. The wax blends according to claim 1, wherein the long-chain hydrocarbons are Fischer-Tropsch waxes or a mixture of Fischer-Tropsch waxes and microcrystalline waxes.

21. The wax blends according to claim 1, wherein at least some of the long-chain hydrocarbons are hydroisomerised Fischer-Tropsch waxes.

\* \* \* \* \*